March 18, 1958     E. L. TROCCIA     2,826,855
FISH HOOK DEVICES
Filed Nov. 23, 1956

INVENTOR.
Edmond L. Troccia
BY Wm. T. Wofford
Attorney

2,826,855

FISH HOOK DEVICES

Edmond L. Troccia, Fort Worth, Tex.

Application November 23, 1956, Serial No. 623,901

3 Claims. (Cl. 43—44.83)

My invention relates to fish hooks, and more particularly to detachable fish hook devices.

The conventional type fish hook wherein the barb and eye shank are a unitary structure, is subject to a number of significant disadvantages. The hook must be removed from a fish by drawing the barb back out along its path of entry, which is often a difficult and disagreeable task. In many instances, removal of the conventional type hook causes serious damage to fish which because of their size or variety must, in accordance with game laws, be thrown back. While some efforts have been made to overcome the disadvantages abovementioned, no entirely satisfactory solution has been presented.

It is accordingly an object of my invention to provide a fish hook device which will obviate the disadvantages of the conventional type fish hook.

It is another object of my invention to provide an improved detachable fish hook device.

It is another object of my invention to provide an improved fish hook device wherein the hook barb may be quickly and easily detached from the eye shank.

It is another object of my invention to provide a fish hook device wherein various sizes and types of hooks may be quickly removed or attached to a common eye shank.

These and other objects are effected by my invention as will be apparent from the following description taken in accordance with the accompanying drawings, forming a part of this application, in which.

Figure 1:
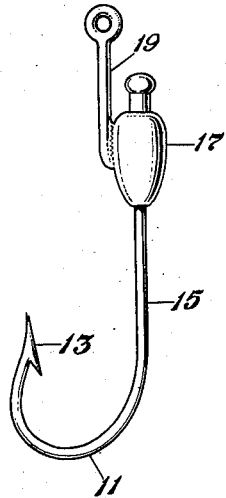
Fig. 1 is a general perspective view of a typical fish hook device in accordance with a preferred embodiment of my invention.
Figure 2:
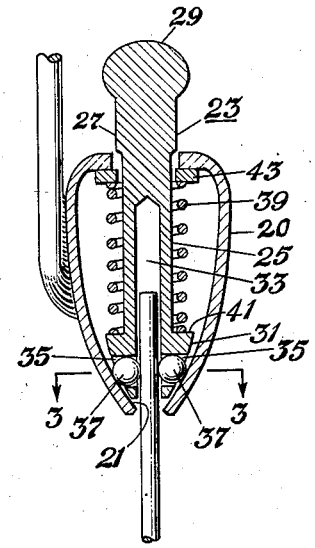
Fig. 2 is an enlarged vertical center section view showing details of the clutch mechanism of Fig. 1.

In Fig. 1 there is shown a detachable fish hook device comprising an eyeless hook 11 having a barb 13 and a straight shank portion 15, a clutch mechanism 17, and an eye shank 19. The eye shank is fixed to the body of the clutch mechanism and extends generally upward therefrom, more or less parallel to the clutch mechanism longitudinal axis. The end portion of the shank 15 of the eyeless hook 11 is inserted into the receptacle of the clutch mechanism 17. The clutch mechanism has an inverted pear shaped hollow body 20 having a centrally disposed circular opening at each end. The lower inside surface 21 of the body is symmetrical with respect to a central longitudinal axis and tapers inwardly toward the body lower portion. Co-operating with the clutch body is a plunger 23 comprising a first cylindrical portion 25 terminating at one end in a second larger cylindrical portion 27 which in turn terminates in an enlarged ball-like end portion 29. The said plunger first cylindrical portion terminates at its other end in a clutch ball holder 31. The clutch ball holder 31 has a cross section outline generally in the shape of an inverted frustum of an ellipse, with the outer walls of the holder 31 generally conforming to but spaced from the inner walls of the clutch body at its lower end. The central longitudinal axes of the plunger first and second cylindrical portions 25, 27 and ball-like end portion 29, the clutch ball carrier 31, and the clutch body 20, are all common. A central bore 33 extends through the clutch ball carrier 31 and up into the plunger first cylindrical section 25, forming a receptacle for the shanks of eyeless hooks. The clutch ball carrier 31 is provided with three radial openings 35, 120 degrees apart, each communicating between the said central bore to the clutch body inner wall. Each of these radial openings carries a clutch ball 37. Dimensions of the radial openings 35, the clutch balls 37, and the ball carrier 31 are chosen such that a diameter of a ball is greater than the length of the radial opening, so that the ball may be in contact with the clutch body inner wall 21 and also the surface of the eyeless hook shank 15 to be received by the clutch. A compression spring 39 is located concentrically with respect to the plunger first cylindrical portion 25 and bears at one end on a shoulder 41 formed by the base of the clutch ball carrier 31 and at the other end on a collar washer 43 which is slidably carried by said first cylindrical portion 25 of the plunger 23. The collar washer 43 is larger than the opening in the upper end of the clutch body 20, so it is forced by the compression spring 39 up against the top inside wall of the clutch body. The enlarged ball portion 29 at the end of the plunger 23 serves as a finger handle for actuating the clutch mechanism to the release position.

Figure 3:
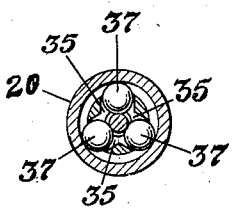
Fig. 3 is a section view taken on lines 3—3 of Fig. 2.
Figure 4:
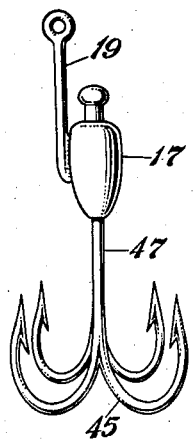
Fig. 4 is a general perspective view of a fish hook device in accordance with another embodiment of my invention.
Figure 5:
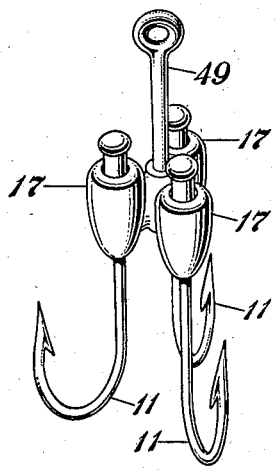
Fig. 5 is a general perspective view of a fish hook device in accordance with a further embodiment of my invention.

The detachable fish hook device shown by Fig. 3 is identical to that of Fig. 1 except that the hook 45 is of the multiple barb type having a common eyeless shank 47 which is received by the clutch mechanism 17. In Fig. 5 there is shown a common eye shank 49 fixed to multiple clutch mechanisms, with a single barb eyeless hook 11 received by each clutch mechanism.

In operation, the end of the shank 15 of an eyeless hook 11 being received by the clutch mechanism 17 forces the plunger 23 upward enough to allow the balls 37 to separate making an opening large enough to receive the shank 15. Then as pulling force is applied between the eye shank 19 and the hook 11, the balls 37 tend to roll toward the bottom of the clutch mechanism, coming closer together. As the force exerted increases, the balls 37 are forced further downward on the clutch body inner surface 21 and closer together, thus ever tightening the grip of the balls 37 on the hook shank 15. When it is desired to detach the hook 11, the plunger 23 is merely pulled outward with respect to the clutch body 20, causing the balls 37 to move further apart and allowing the hook shank 15 to move in a longitudinal direction. The hook shank 15 will always swivel on the balls 37, regardless of the amount of tension applied.

It will be apparent from the foregoing that the detachable fish hook devices of my invention are simple and effective. Hooks may be easily removed from a fish without returning the barb back along its entry path. Various sizes and styles of eyeless hooks may be used in connection with a single clutch mechanism, so the fisherman may change from one to another quickly and conveniently without the necessity for detaching a line.

My invention is easily adaptable to various types of artificial lures, both top water and underwater.

The foregoing disclosure and the showings made in the drawings are merely illustrative of the principles of this invention, and are not to be interpreted in a limiting sense.

I claim:

1. A detachable fish hook device comprising a plurality of hooks each having a smooth shank, a clutch adapted for receiving each said shank, and means for securing a line to said device.

2. A detachable fish hook device comprising a plurality of hooks each having a smooth shank, a plurality of clutches each adapted for receiving a respective one of said shanks, and means for securing a line to said device.

3. A detachable fish hook device comprising an eyeless hook having a barb and a shank, said hook being free of any protrusion between said barb and the end of said shank; a ball type clutch including a body portion, a receptacle portion adapted for receiving the end of said shank portion, and a release actuator; and means for securing a line to said clutch body.

References Cited in the file of this patent

UNITED STATES PATENTS

| | | |
|---|---|---|
| 989,392 | Mueller | Apr. 11, 1911 |
| 2,010,598 | Leighton | Aug. 6, 1935 |
| 2,345,197 | Hirsch | Mar. 28, 1944 |